US008239135B2

(12) United States Patent
Day et al.

(10) Patent No.: US 8,239,135 B2
(45) Date of Patent: Aug. 7, 2012

(54) METHOD FOR CALCULATION OF SEISMIC ATTRIBUTES FROM SEISMIC SIGNALS

(75) Inventors: Anthony James Day, Drammen (NO);
Tilman Klüver, Oslo (NO)

(73) Assignee: PGS Geophysical AS, Lysaker (NO)

( * ) Notice: Subject to any disclaimer, the term of this patent is extended or adjusted under 35 U.S.C. 154(b) by 532 days.

(21) Appl. No.: 12/387,769

(22) Filed: May 7, 2009

(65) Prior Publication Data

US 2010/0286920 A1    Nov. 11, 2010

(51) Int. Cl.
*G01V 1/28* (2006.01)
(52) U.S. Cl. ............................................... 702/17
(58) Field of Classification Search ............. 702/17
See application file for complete search history.

(56) References Cited

U.S. PATENT DOCUMENTS

| | | | | |
|---|---|---|---|---|
| 4,882,713 | A * | 11/1989 | Hughes | 367/47 |
| 5,828,570 | A | 10/1998 | Gaiser | |
| 6,021,379 | A * | 2/2000 | Duren et al. | 702/16 |
| 6,594,585 | B1 | 7/2003 | Gersztenkorn | |
| 6,625,543 | B1 * | 9/2003 | Bevc et al. | 702/14 |
| 7,359,283 | B2 | 4/2008 | Vaage et al. | |
| 2005/0027769 | A1 | 2/2005 | Witten | |
| 2006/0133206 | A1 | 6/2006 | Barnes | |
| 2009/0185444 | A1 * | 7/2009 | Kluver | 367/24 |

FOREIGN PATENT DOCUMENTS

| | | |
|---|---|---|
| EP | 2 103 959 | 3/2009 |
| GB | 2 305 725 | 4/1997 |
| RU | 97108599 | 5/1999 |
| WO | WO 98/20367 | 5/1998 |

OTHER PUBLICATIONS

Sergey Fomel, "Velocity-independent time-domain seismic imaging using local event slopes", Geophysics, vol. 72, No. 3, (May-Jun. 2007), p. S139-S147.
European Search Report and Search Opinion, date of mailing, Sep. 29, 2010.
M. Ohrnberger, E. Schissele, C. Cornou, S. Bonnefoy-Claudet, M. Wathelet, A. Savvaidis, F. Scherbaum, D. Jongmans, (2004), "Frequency wavenumber and spatial autocorrelation", 13th World Conference on Earthquake Engineering, Canada, p. 1-15.
Eurasian Search Report, date of mailing, Oct. 19, 2010.

* cited by examiner

*Primary Examiner* — Manuel L Barbee (57) ABSTRACT

Filters are applied to seismic signals representative of subsurface formations to generate filtered signals with attenuated spatially aliased energy. The filtered signals are multiplied in the frequency-wavenumber domain by a complex function of frequency and wavenumber representing the seismic attribute in the frequency-wavenumber domain, to generate scaled signals. The scaled signals, transformed to the time-space domain, are divided by the filtered signals in the time-space domain, to a seismic attribute useful for identifying and characterizing the subsurface formations.

33 Claims, 9 Drawing Sheets

METHOD FOR CALCULATION OF SEISMIC ATTRIBUTES FROM SEISMIC SIGNALS

BACKGROUND OF THE INVENTION

1. Field of the Invention

This invention relates generally to the field of geophysical prospecting. More particularly, the invention relates to the field of calculation of attributes related to wave propagation direction.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes and recorded.

The resulting seismic data obtained in performing a seismic survey is processed to yield information relating to the geologic structure and properties of the subterranean formations in the area being surveyed. The processed seismic data is processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the Earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source. In an air gun array, each air gun typically stores and quickly releases a different volume of highly compressed air, forming a short-duration impulse.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of spatial arrays.

A particle motion sensor, such as a geophone, has directional sensitivity, whereas a pressure sensor, such as a hydrophone, does not. Accordingly, the upgoing wavefield signals detected by a geophone and hydrophone located close together will be in phase, while the downgoing wavefield signals will be recorded 180 degrees out of phase. Various techniques have been proposed for using this phase difference to reduce the spectral notches caused by the surface reflection and, if the recordings are made on the seafloor, to attenuate water borne multiples. It should be noted that an alternative to having the geophone and hydrophone co-located, is to have sufficient spatial density of sensors so that the respective wavefields recorded by the hydrophone and geophone can be interpolated or extrapolated to produce the two wavefields at the same location.

Conventional 3D (three-dimensional) marine seismic acquisition by towed streamer can result in spatial aliasing in inline (parallel to the towed streamers), cross-line (perpendicular to the towed streamers), or even both directions. The sampling density in towed streamers is typically denser in the inline direction than in the cross-line direction. The asymmetry is due to a wider spacing between receivers in separate streamers than between receivers in the same streamer. This asymmetry can lead to spatial aliasing of the sampling data in the cross-line direction. However, there can also be spatial aliasing in the inline direction. For example, inline direction aliasing may be a problem in processing high resolution shallow seismic data with large emergence angles. In ocean bottom cables, the receiver spacing along the cable may be coarser than the typical 12.5 meter spacing in towed streamers. Further, aliasing can become a problem in domains where spacing is intrinsically coarser than in a common shot domain. For example, the shot interval may be as much as 50 meters in a common receiver domain.

This spatial aliasing interferes with conventional efforts to accurately evaluate seismic attributes from the seismic data. For example, a seismic attribute, the inverse obliquity factor, is commonly used to correct the vertical particle velocity from geophones for non-vertical emergence angles. This correction, in turn, makes possible a more accurate combination of the pressure and particle motion signals to derive the up-going and down-going wavefield components. The effect of the surface reflection is removed if the up-going wavefield is considered in isolation, and the up- and down-going wavefields may subsequently be combined to attenuate water borne multiples in the seismic signal.

Thus, a need exists for a method for transforming seismic data into seismic attributes that attenuates the effects of spatial aliasing in any direction and in any domain induced by typical marine acquisition geometries.

BRIEF SUMMARY OF THE INVENTION

The invention is a method for transforming seismic signals representative of subsurface formations into a seismic attribute useful for identifying and characterizing the subsurface formations. Filters are applied to seismic signals to generate filtered signals with attenuated spatially aliased energy. The filtered signals are multiplied in the frequency-wavenumber domain by a complex function of frequency and wavenumber representing the seismic attribute in the frequency-wavenumber domain, to generate scaled signals. The scaled signals, transformed to the time-space domain, are divided by the filtered signals in the time-space domain, to generate the seismic attribute.

In another embodiment, the invention is a method for transforming seismic signals representative of subsurface formations into a seismic attribute useful for identifying and characterizing the subsurface formations. A programmable computer is used to perform the following. Filters are applied to seismic signals to generate filtered signals with attenuated spatially aliased energy. The filtered signals are multiplied in the frequency-wavenumber domain by a complex function of frequency and wavenumber representing the seismic attribute in the frequency-wavenumber domain, to generate scaled signals. The scaled signals, transformed to the time-space domain, are divided by the filtered signals in the time-space domain, to generate the seismic attribute.

In yet another embodiment, the invention is a computer readable medium with a computer program stored thereon, with the program having logic operable to cause a programmable computer to perform the following. Filters are applied to seismic signals to generate filtered signals with attenuated spatially aliased energy. The filtered signals are multiplied in the frequency-wavenumber domain by a complex function of frequency and wavenumber representing the seismic attribute in the frequency-wavenumber domain, to generate scaled signals. The scaled signals, transformed to the time-space domain, are divided by the filtered signals in the time-space domain, to generate the seismic attribute.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

In general, seismic attributes are any information obtained from seismic signals to obtain seismic characteristics of interest. Typically, seismic attributes comprise quantitative measures of seismic signals useful for identifying and characterizing subsurface formations of the earth in the search for producible hydrocarbon deposits. In particular, seismic attributes are often based upon making measurements of time, amplitude, and frequency (or phase) in the seismic signals. Time measurements usually relate to geometric properties, such as subsurface formation structure, while amplitude and frequency measurements usually relate to physical properties, such as subsurface formation stratigraphy and hydrocarbon reservoir characterization.

Some examples of seismic attributes include: picking two-way travel times and dips from seismic reflection records to generate formation structure; calculating velocities to convert the travel times to depths; relating high reflection amplitude areas, called "bright spots", on seismic sections to gas zones; performing complex-trace analysis to calculate instantaneous phase and frequency; and calculating coherence measures, such as cross-correlation, semblance, and eigenvalue analysis, to reveal faults and other stratigraphic features in 3D seismic data.

The invention is a method for transforming seismic signals representative of subsurface formations into a seismic attribute useful for identifying and characterizing the subsurface formations. First, filters are applied to seismic data to attenuate spatially aliased energy. Possible seismic attributes can be calculated by applying scaling filters in the frequency-wavenumber domain to the filtered data transformed from the time-space domain, followed by transformation of the scaled data back to the time-space domain. The attribute can then be calculated in the time-space domain by combination with the filtered data prior to application of the frequency-wavenumber scaling filter. The calculated seismic attributes can further be used for different applications. Without limiting its scope, the invention is illustrated by an example for separating dual-sensor wavefields into up-going and down-going components.

In one embodiment, the invention is a method to calculate seismic attributes in the time-space domain from seismic sections. The seismic sections can be two- or three-dimensional. In one particular embodiment, the attributes are related to the wave propagation direction. These attributes can include, but are not restricted to, components of the slowness vector, emergence and azimuth angles.

Figure 1:
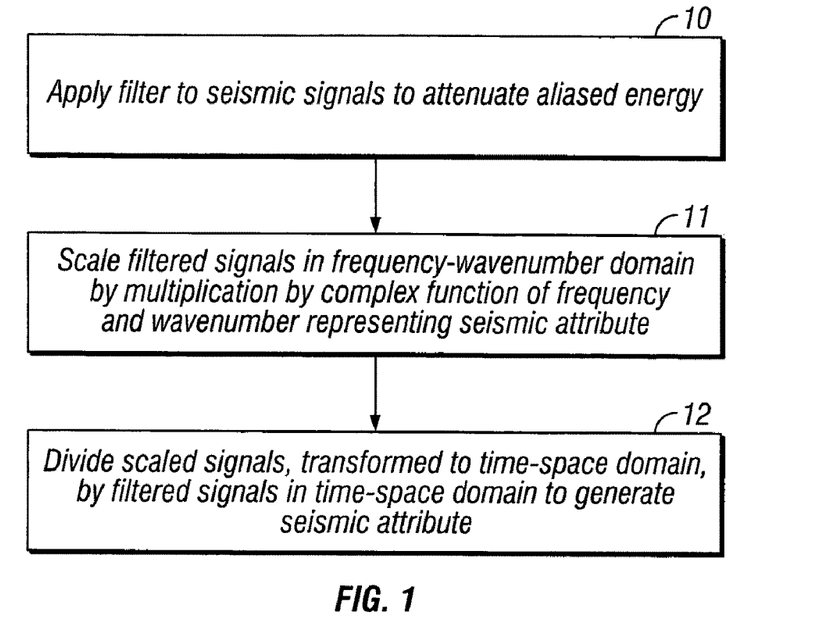
FIG. 1 is a flowchart illustrating an embodiment of the invention for calculating a seismic attribute.
Figure 2:
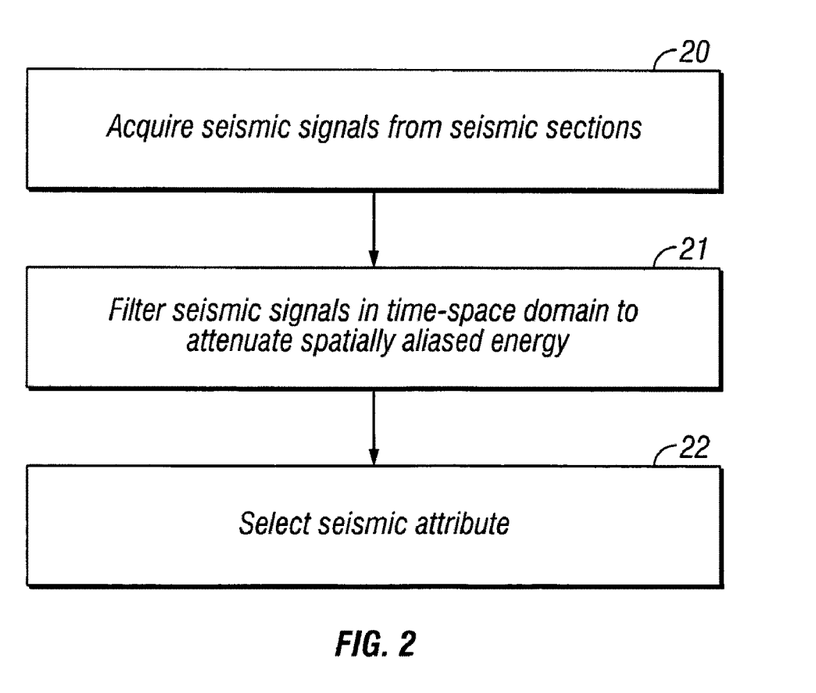
FIG. 2 is a flowchart illustrating an embodiment of the invention for filtering seismic signals.
Figure 3:
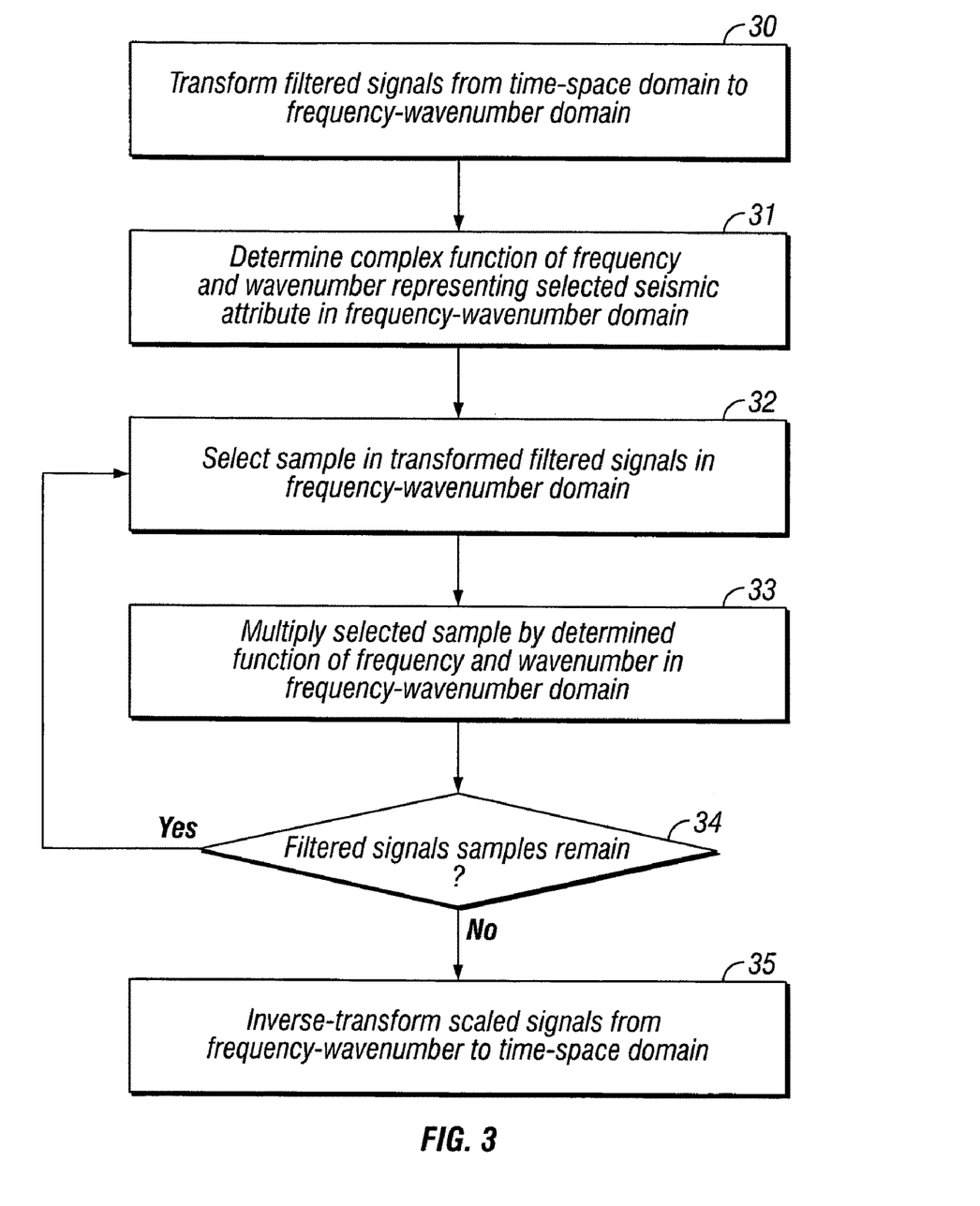
FIG. 3 is a flowchart illustrating an embodiment of the invention for scaling seismic signals by a frequency wavenumber representation of a seismic attribute.
Figure 4:
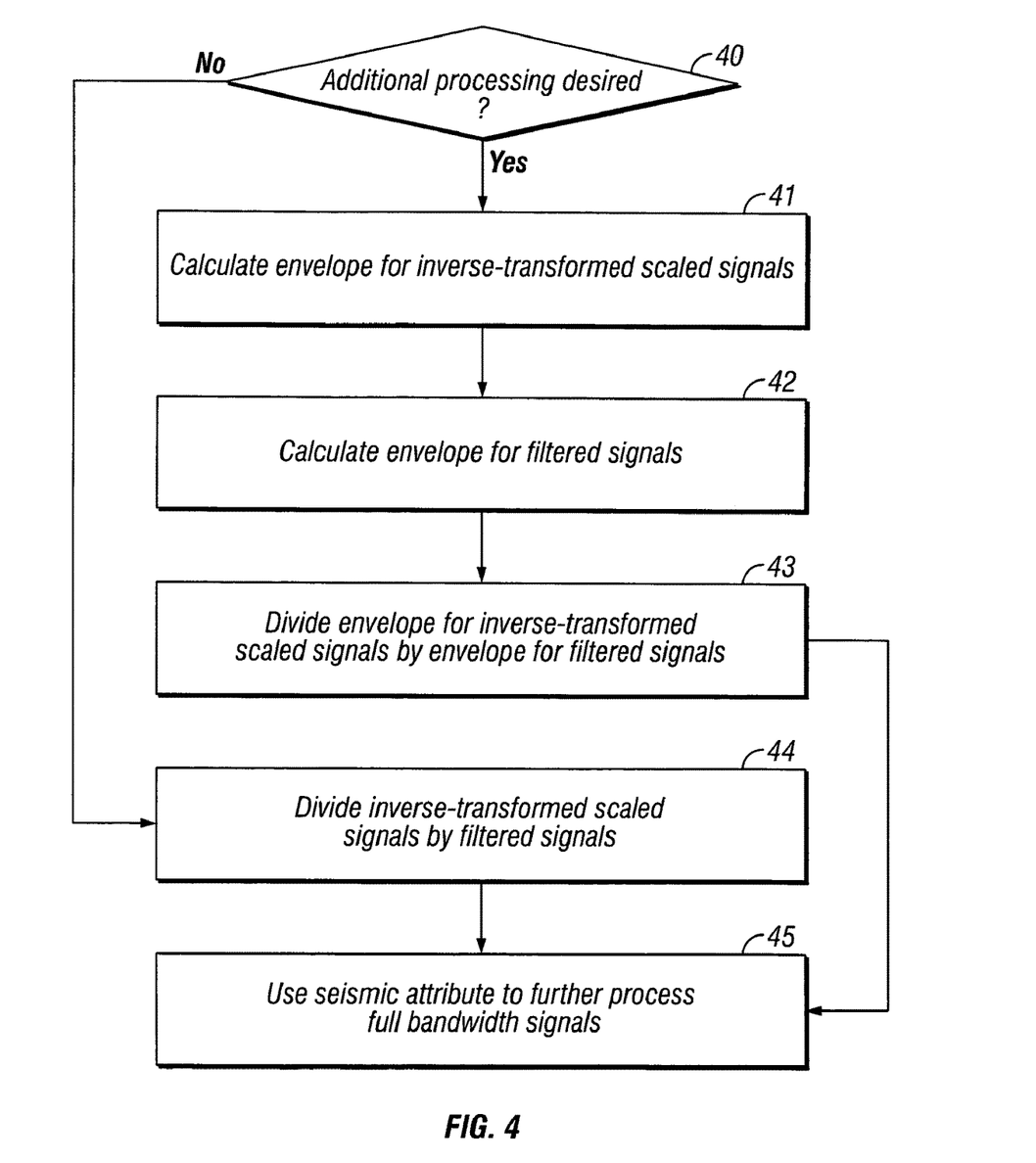
FIG. 4 is a flowchart illustrating an embodiment of the invention for calculating a seismic attribute.

FIGS. 1-4 show flowcharts illustrating embodiments of the invention for calculating a seismic attribute from seismic sections. FIG. 1 is a flowchart illustrating a general embodiment of the invention. FIGS. 2-4 are flowcharts further illustrating more particular embodiments of the invention as described in FIG. 1. FIGS. 5-10 are sections and spectra that illustrate an example use of the invention as described in FIGS. 1-4.

FIG. 1 is a flowchart illustrating an embodiment of the invention for transforming seismic signals into a seismic attribute. At block 10, filters are applied to seismic signals to generate filtered signals with attenuated spatially aliased energy. At block 11 the filtered signals from block 10 are multiplied in the frequency-wavenumber domain by a complex function of frequency and wavenumber representing the seismic attribute in the frequency-wavenumber domain, to generate scaled signals. At block 12, the scaled signals from block 11, transformed to time-space domain, are divided in the time-space domain by the filtered signals from block 10, to generate the seismic attribute.

FIG. 2 is a flowchart illustrating an element of the invention, regarding filtering seismic signals. FIG. 2 illustrates in more detail the portion of the invention discussed in block 10 of FIG. 1, above.

At block 20, seismic signals are acquired from seismic sections. The seismic signals are indicative of subterranean formations of the earth. The seismic signals may be from common shot gathers or common receiver gathers, or from any other appropriate seismic domain. The seismic signals may be pressure signals from pressure sensors such as hydrophones, which will be designated for merely illustrative purposes as h(t,x), or vertical particle velocity signals from particle motion sensors such as geophones or accelerometers which will be designated for merely illustrative purposes as g(t,x). In the following discussion, the seismic signals will be illustrated by pressure signals h(t,x), but this illustrative use of pressure signals is not to be considered as a limitation on the invention. Here, signals in the time domain are denoted by lower case letters, while the same signals in the frequency domain are denoted by the corresponding capital letters.

At block 21, filters are applied to the seismic signals h(t,x) acquired in block 20 to attenuate spatially aliased energy, generating filtered signals $h_f(t,x)$. The filters can be applied in the time-space domain or, alternatively, in the frequency-space domain. In one embodiment, a low-pass filter is employed to attenuate the spatially aliased energy.

At block 22, a seismic attribute a(t,x) is selected to transform the filtered signals $h_f(t,x)$ from block 21 into. The seismic attribute is also indicative of subterranean formations of the earth. In one embodiment, the seismic attribute a(t,x) selected is related to wave propagation direction.

FIG. 3 is a flowchart illustrating an element of the invention, regarding scaling seismic signals by a frequency wavenumber representation of a seismic attribute. FIG. 3 illustrates in more detail the portion of the invention discussed in block 11 of FIG. 1, above.

At block 30, a transform is applied to the filtered signals $h_f(t,x)$ from block 21 of FIG. 2 to transform the filtered signals $h_f(t,x)$ from the time-space (t,x) domain to the frequency-wavenumber (ω,k) domain, generating transformed filtered signals $H_f(\omega,k)$. The transform can be accomplished by applying any well-known frequency-wavenumber transform, such as, for example, Fourier transforms. In particular, Fast Fourier Transforms (FFT's) may be employed for computational efficiency.

At block 31 a function A(ω,k) of frequency and wavenumber is determined that represents the seismic attribute a(t,x), selected in block 22 of FIG. 2, in the frequency-wavenumber domain. The function A(ω,k) is a complex variable function of frequency and wavenumber. Determination of the seismic attribute function will be discussed in more detail below with an example calculation of the inverse obliquity factor.

At block 32 a sample $H_f(\omega,k)$ in the frequency-wavenumber domain is selected in the transformed filtered signals from block 30.

At block 33, the sample $H_f(\omega,k)$ from block 32 is scaled by being multiplied in the frequency-wavenumber domain by the function of frequency and wavenumber A(ω,k) determined in block 31, to generate a scaled sample $H_s(\omega,k)$. Thus, in one embodiment, the scaled sample $H_s(\omega,k)$ is calculated as follows:

$$H_s(\omega,k) = H_f(\omega,k) \cdot A(\omega,k) \quad (1)$$

At block 34, it is determined if any more samples $H_f(\omega,k)$ remain. If the determination is yes, more samples remain, then the process returns to block 32 to select another sample. If the determination is no, no more samples remain, then the process proceeds on to block 35, below.

At block 35, an inverse transform is applied to the scaled signals $H_s(\omega,k)$ from block 34 to inverse-transform the scaled signals $H_s(\omega,k)$ from the frequency-wavenumber (ω,k) domain back to the time-space (t,x) domain, generating inverse-transformed scaled signals $h_s(t,x)$. The inverse-transform can be accomplished by applying any well-known frequency-wavenumber transform, such as, for example, inverse-Fourier transforms. In particular, Inverse Fast Fourier Transforms (IFFT's) may be employed for computational efficiency.

FIG. 4 is a flowchart illustrating an element of the invention, regarding-calculating a seismic attribute. FIG. 4 illustrates in more detail the portion of the invention discussed in block 12 of FIG. 1, above.

At block 40, it is determined if additional processing is desired before calculating the seismic attribute a(x,t). However, this additional processing is only appropriate for the case of unsigned attributes (that is, no negative values). If the determination is yes, additional processing is desired, then the process proceeds to block 41 to perform the processing. If the determination is no, no additional processing is desired, then the process skips to block 43, below.

At block 41, an envelope env[$h_s(t,x)$] is calculated for the inverse-transformed scaled signals $h_s(x,t)$ from block 35 of FIG. 3.

At block 42, an envelope env[$h_f(t,x)$] is calculated for the filtered signals $h_f(x,t)$ from block 21 of FIG. 2.

At block 43, the envelope env[$h_s(t,x)$] for the inverse-transformed scaled signals calculated in block 41 is divided by the envelope env[$h_f(t,x)$] for the filtered signals calculated in block 42 in the time-space domain. This division generates a ratio that yields the desired seismic attribute a(t,x) as a function of time and space. Thus, in one embodiment, the seismic attribute a(t,x) is calculated as follows:

$$a(t,x) = \frac{env[h_s(t,x)]}{env[h_f(t,x)]}. \quad (2)$$

Then, the process proceeds to block 45.

At block 44, the inverse-transformed scaled signals $h_s(x,t)$ from block 36 of FIG. 3 are divided by the filtered signals $h_f(t,x)$ from block 21 of FIG. 2 in the time-space domain. This division generates a ratio that yields the desired attribute a(t,x) as a function of time and space. Thus, in another embodiment, the seismic attribute a(t,x) is calculated as follows:

$$a(t,x) = \frac{h_s(t,x)}{h_f(t,x)}. \quad (3)$$

At block 45, the seismic attribute from block 43 or from block 44 may be used in further processing of the full bandwidth seismic signal.

Conventionally, separating seismic signals recorded from a dual-sensor streamer into up-going and down-going wavefield components would entail the following steps. The pressure (hydrophone) and vertical particle velocity (geophone) traces h(t,x) and g(t,x), respectively, could be corrected for impulse response differences between the two types of detectors. The vertical particle velocity trace amplitudes could also be corrected for non-vertical arrivals of seismic waves and, if necessary, streamer tow noise. Although illustrated as corrections in the time-space domain, these corrections could be done in either the time-space domain, the frequency-wavenumber domain, or any other domain that is convenient. The corrected pressure and vertical particle velocity traces contained in a common-shot gather are then transformed into the frequency-wavenumber ("f-k") domain, yielding H($\omega$,k) and G($\omega$,k), respectively. The transformations can be done by any well-known f-k transform, such as, for example, Fourier transforms.

The upward traveling pressure wave field, U($\omega$,k), and the downward traveling pressure wave field, D($\omega$,k), would be computed in the f-k domain, using the equations:

$$U(\omega, k) = \frac{H(\omega, k) - G(\omega, k)}{2} \quad (4)$$

and $$D(\omega, k) = \frac{H(\omega, k) + G(\omega, k)}{2}. \quad (5)$$

Then, the up-going and down-going wavefields U($\omega$,k) and D($\omega$,k) from Equations (4) and (5), respectively, can be used in further processing, such as surface related multiple attenuation. The results are eventually inverse-transformed from the frequency-wavenumber domain back to the time-space domain.

An example illustrating the method of the invention is presented. This example uses the calculation of the inverse obliquity factor, $$\frac{1}{\cos(\theta)}, \quad (6)$$

where $\theta$ is the emergence angle, also known as the incidence angle or arrival angle. This factor is used to scale the particle velocity traces to permit accurate separation of dual-sensor data into up-going and down-going wavefield components. Calculating this factor from non-aliased energy and then applying it in the time-space domain, as in the method of the invention, is expected to handle aliased energy better than the commonly applied separation in the frequency-wavenumber domain.

As above, the pressure signal, h(t,x), and the vertical particle velocity signal, g(t,x), are optionally corrected, if deemed necessary, for impulse response differences between the pressure signal sensor and the vertical particle velocity signal sensor. This correction for relative differences in the instrument transfer functions correspond to instrument impulse responses in the time domain. In one embodiment, these corrections could be correcting the amplitude and phase of the pressure signals to match the particle velocity signals, or, in an alternative embodiment, correcting the particle velocity signals to match the pressure signals, or, in a further alternative embodiment, correcting both data sets to a common basis. Correcting for relative differences in instrument impulse responses is well known in the art. Finally, an amplitude scaling equal to the acoustic impedance in the water is preferably applied to the particle velocity signals to correct for the relative differences in amplitudes of pressure and particle velocity. This is also well known in the art.

The vertical particle velocity signal, g(t,x), is further corrected for non-vertical arrival angles of the reflected seismic waves. This scaling is achieved by calculating the inverse obliquity factor, corresponding to Equation (6), but using the method of this invention, as follows. The inverse obliquity factor may be obtained using either the recorded pressure signals or the vertical particle velocity signals. Here, the procedure will be demonstrated using the pressure signal h(t,x), although this choice is for illustrative purposes only and is not intended to be a limitation of the invention. First, a low-pass filter is applied to remove spatially aliased energy, generating filtered signal $h_f$(t,x). The filtered signals are transformed from the time-space (t,x) domain to the frequency-wavenumber ($\omega$,k) domain, generating transformed samples $H_f$($\omega$,k). The signals are then scaled by dividing by the cosine of the incidence angle to obtain $H_\theta$($\omega$,k) as follows:

$$H_\theta(\omega, k) = \frac{H_f(\omega, k)}{\cos(\theta)}, \quad (7)$$

where $$\cos(\theta) = \sqrt{1 - \frac{v^2|k|^2}{\omega^2}}. \quad (8)$$

Here, v is the velocity of sound in water, typically about 1500 m/s, and |k| is the absolute value of the angular wavenumber. The specific filtered, transformed (into the frequency-wavenumber domain), and then scaled (by the inverse obliquity factor) signals $H_\theta$($\omega$,k) in Equation (7) corresponds to the more general scaled signals $H_s$($\omega$,k) referred to in the discussion of the invention with regard to the flowchart in FIG. 3, above.

The scaled signals $H_\theta$($\omega$,k) are then inverse-transformed from the frequency-wavenumber ($\omega$,k) domain back to the time-space (t,x) domain, generating inverse-transformed scaled signals $h_\theta$ (t,x). This inverse-transformed scaled signals $h_\theta$ (t,x) corresponds to the more general inverse-transformed scaled signals $h_s$(x,t) referred to in the discussion of the invention with regard to the flowchart in FIG. 4, above.

Since the inverse obliquity factor is an unsigned quantity, it is desirable to calculate the envelope of the scaled, filtered signals $h_{f\theta}$ (t,x) and the filtered signals $h_f$(t,x). The ratio of these envelopes yields the inverse obliquity factor as a function of time and space:

$$\frac{1}{\cos(\theta)} = \frac{env[h_\theta(t, x)]}{env[h_f(t, x)]} \quad (9)$$

The inverse obliquity factor in Equation (9), derived from band limited signals, is then used to scale the full-bandwidth particle velocity signal g(t,x), thus attenuating the effects of spatial aliasing:

$$g_\theta(t, x) = g(t, x) \cdot \frac{1}{\cos(\theta)}. \quad (10)$$

Then, the corrected particle velocity signal, $g_\theta(t,x)$, may be optionally corrected for streamer tow noise, if necessary.

An up-going pressure wavefield, $u(t,x)$, is calculated from the corrected pressure signal, $h(t,x)$, and the corrected particle velocity signal, $g_\theta(t,x)$. In one embodiment, the up-going pressure wavefield, $u(t,x)$, is calculated by applying the following equation:

$$u(t, x) = \frac{h(t, x) - g_\theta(t, x)}{2}. \quad (11)$$

A down-going pressure wavefield, $d(t,x)$, is calculated from the corrected pressure signal, $h(t,x)$, and the corrected particle velocity signal, $g_\theta(t,x)$. In one embodiment, the down-going pressure wavefield, $d(t)$, is calculated by applying the following equation:

$$d(t, x) = \frac{h(t, x) + g_\theta(t, x)}{2}. \quad (12)$$

Figure 5:
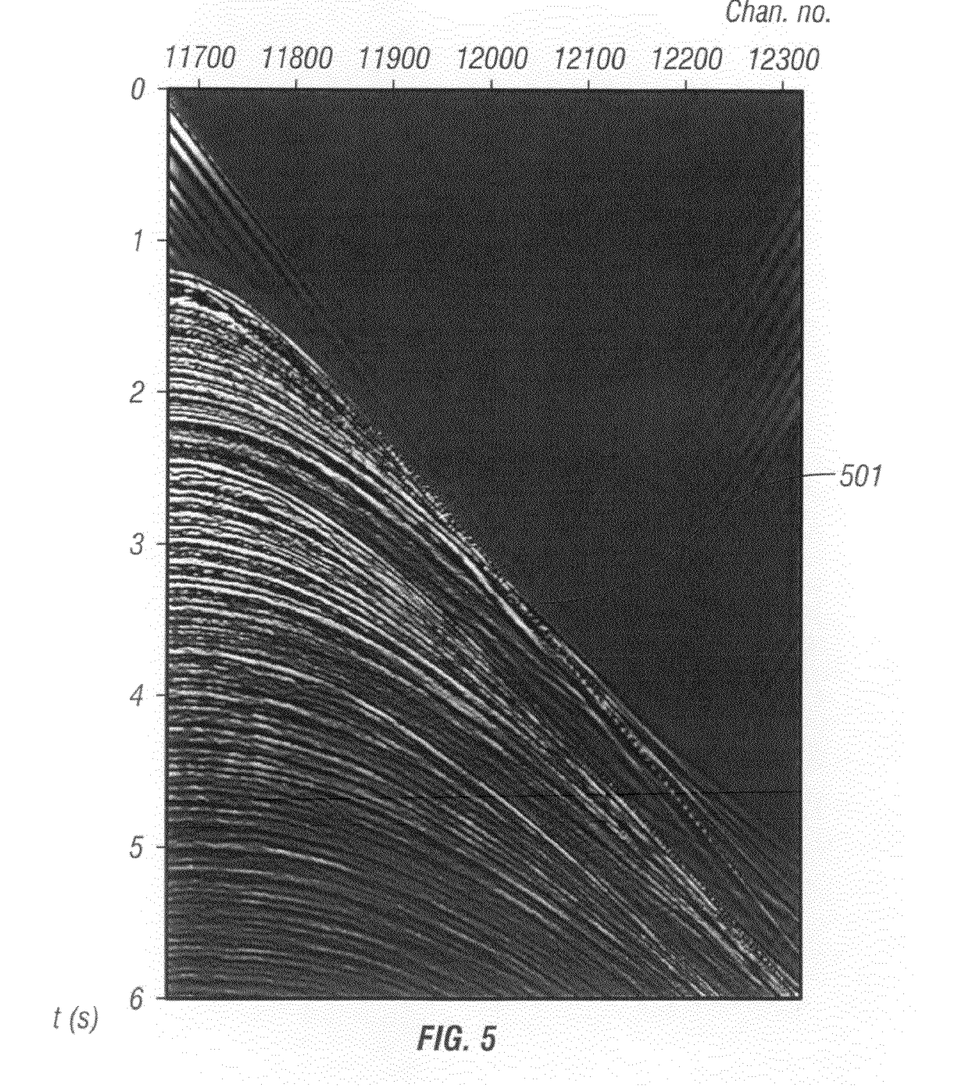
FIG. 5 is an example seismic section of pressure data.
Figure 6:
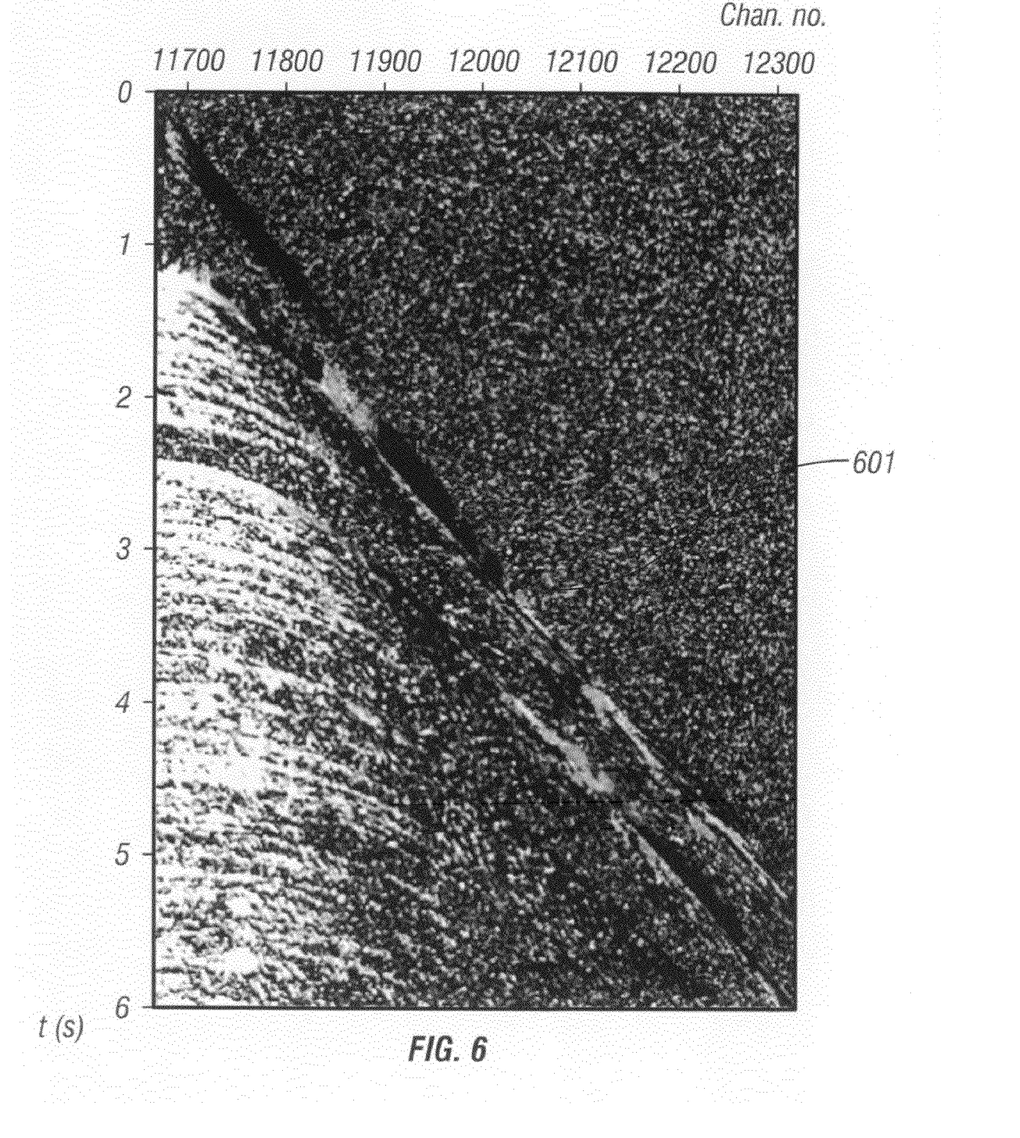
FIG. 6 is a seismic section of a calculated inverse obliquity factor.

FIGS. 5-10 illustrate the method of the invention as shown in the example of the inverse obliquity factor discussed in relation to Equations (6) to (12), above. FIG. 5 is a seismic section of example pressure signals 501. The pressure signals 501 in the seismic section is a recorded hydrophone signal from dual-sensor signals. The pressure signals 501 has been filtered with a low-pass filter from 55 to 60 Hz, to attenuate the spatially aliased energy. FIG. 6 is a seismic section of a calculated inverse obliquity factor 601, as shown in Equation (6).

Figure 7:
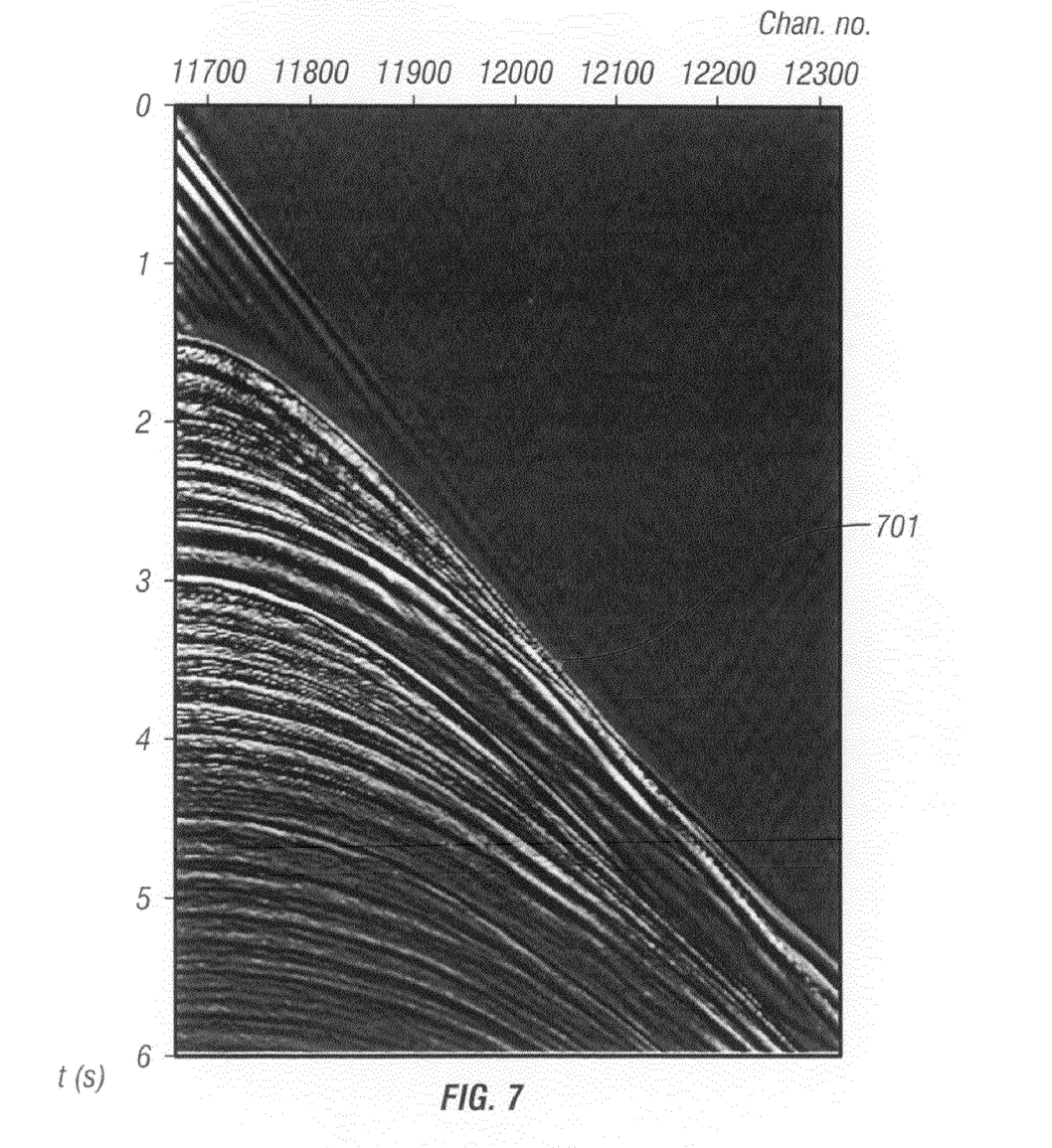
FIG. 7 is a seismic section of the estimated up-going pressure field, with no dip filter.
Figure 8:
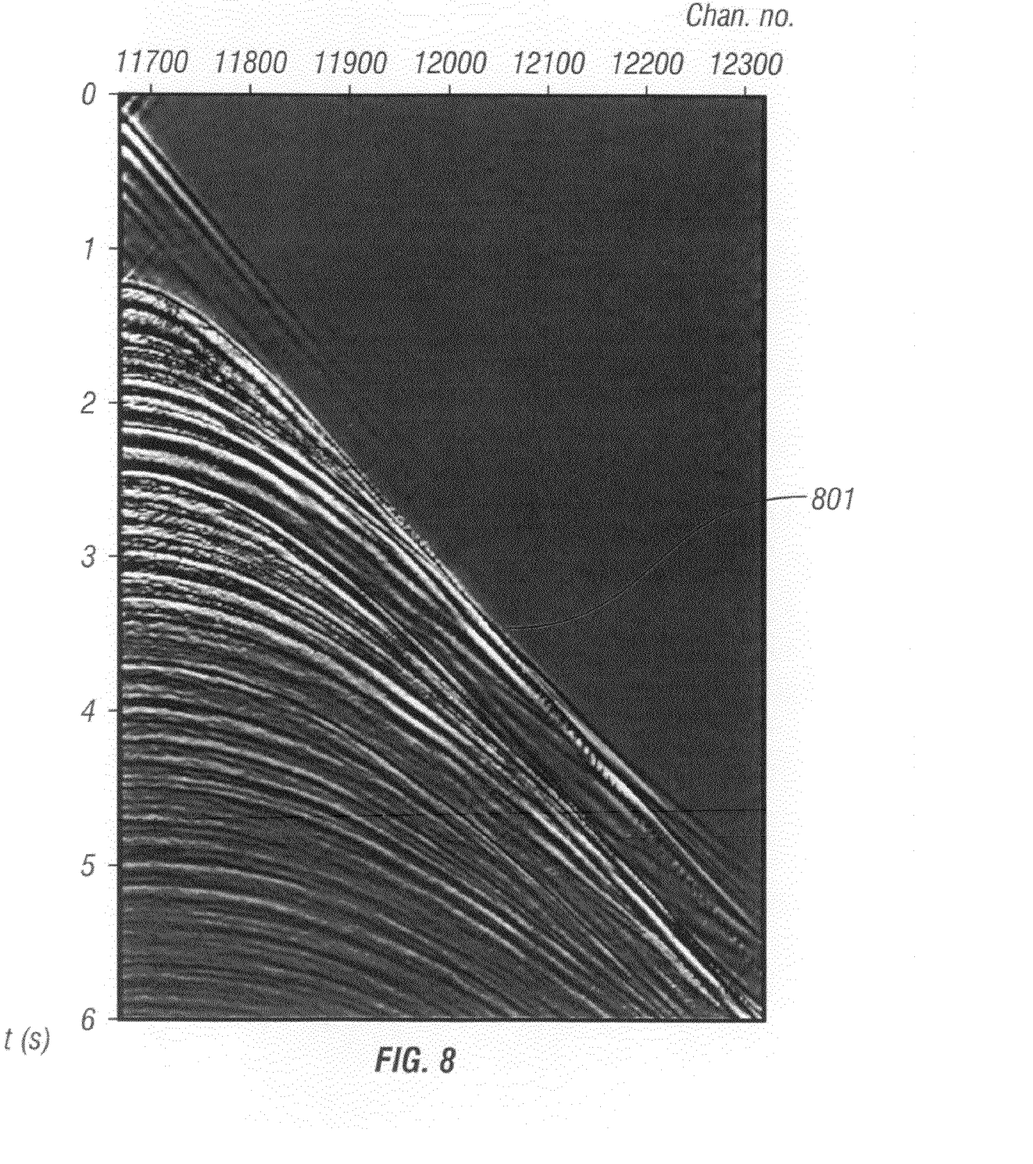
FIG. 8 is a seismic section of the estimated up-going pressure field, dip filtered from 60 to 70 degrees.

FIG. 7 is a seismic section of the estimated up-going pressure field 701, with no dip filter applied. The inverse obliquity factor 601 from FIG. 6, calculated with the help of FFT's, has been applied to the pressure signals 501 from FIG. 5. FIG. 8 is a seismic section of the estimated up-going pressure field 801, now dip filtered from 60 to 70 degrees. The inverse obliquity factor shown in FIG. 6 has been applied.

Figure 9:
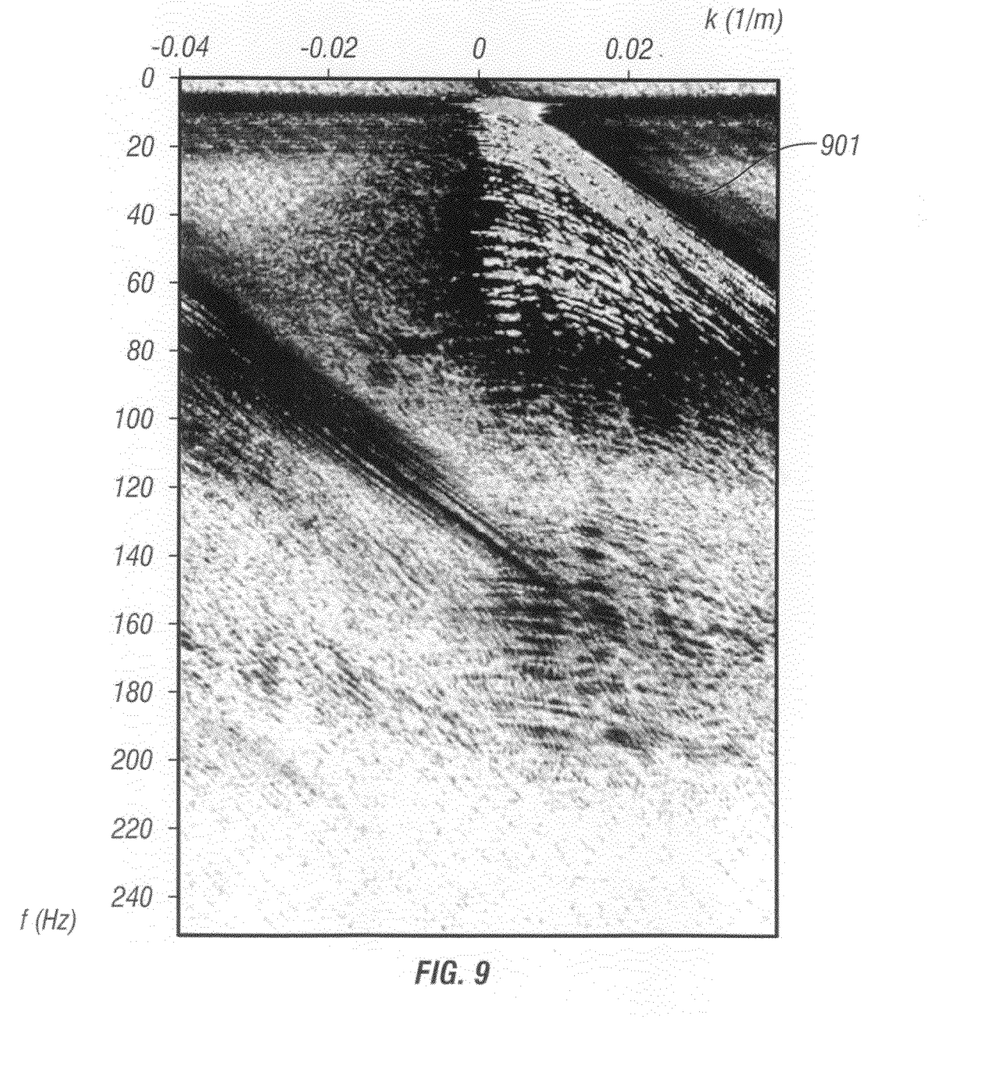
FIG. 9 is the spectra of the seismic section in FIG. 7.
Figure 10:
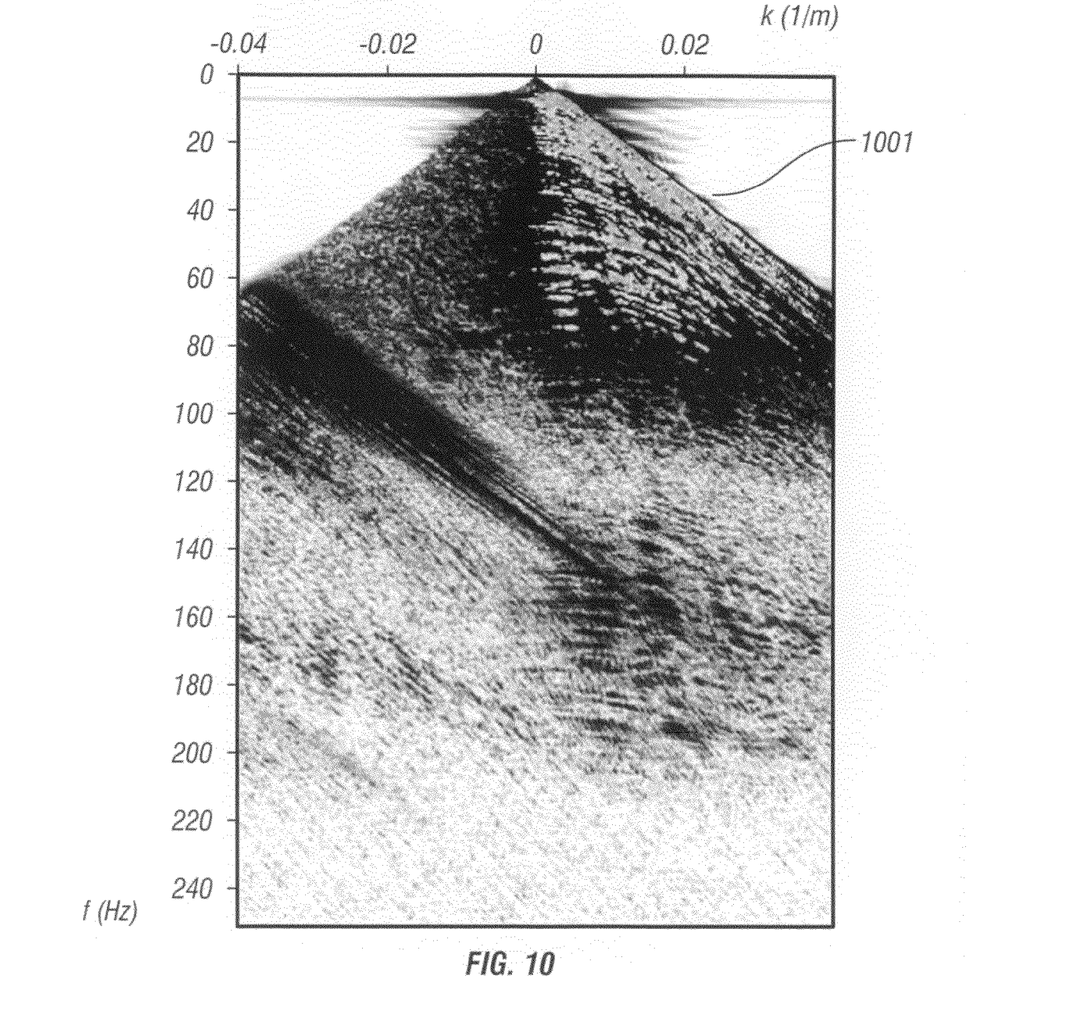
FIG. 10 is the spectra of the seismic section in FIG. 8.

FIG. 9 is the spectra 901 of the seismic section shown in FIG. 7, while FIG. 10 is the spectra 1001 of the seismic section shown in FIG. 8.

In another embodiment, the method of the invention can be employed to determine local event slopes. Using local event slopes then allows one to accomplish common time-domain imaging processes, such as normal moveout (NMO), dip moveout (DMO), and prestack time migration, without having to know seismic velocities. See, for example, Fomel, S., "Velocity-independent time-domain seismic imaging using local event slopes", *Geophysics*, Vol. 27, No. 3, (May-June 2007), p. S139-S147.

Thus, the invention can be employed to perform processing such as wavefield separation without the artifacts associated with current frequency-wavenumber techniques, but with better handling of aliased energy at similar cost to current frequency-wavenumber techniques.

The invention has been discussed above as a method, for illustrative purposes only, but can also be implemented as a system. The system of the invention is preferably implemented by means of computers, in particular digital computers, along with other conventional data processing equipment. Such data processing equipment, well known in the art, will comprise any appropriate combination or network of computer processing equipment, including, but not be limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

In another embodiment, the invention could be implemented as the method described above, specifically carried out using a programmable computer to perform the method. In another embodiment, the invention could be implemented as a computer program stored in a computer readable medium, with the program having logic operable to cause a programmable computer to perform the method described above. In another embodiment, the invention could be implemented as a computer readable medium with a computer program stored on the medium, such that the program has logic operable to cause a programmable computer to perform the method described above.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for geophysical prospecting transforming comprising:
   disposing a marine seismic streamer in a body of water;
   responsive to signals recorded at receivers in the marine seismic streamer, calculating seismic traces representing physical wavefields traveling in the body of water incident on the receivers:
   correcting for spatial aliasing by transforming the seismic traces into a seismic attribute useful for identifying and characterizing subsurface formations, the transforming comprising:
   applying filters to the seismic traces to generate filtered traces with attenuated spatially aliased energy;
   multiplying the filtered traces in frequency-wavenumber domain by a complex function of frequency and wavenumber representing the seismic attribute in the frequency-wavenumber domain, to generate scaled traces;
   dividing the scaled traces, transformed to time-space domain, by the filtered traces in the time-space domain, to generate a seismic attribute with attenuated spatially aliased energy; and
   recording the seismic attribute with attenuated spatially aliased energy.

2. The method of claim 1, wherein the applying filters to the seismic signal comprises:
   acquiring the seismic traces from seismic sections;
   applying filters to the seismic traces in the time-space domain to generate filtered traces with attenuated spatially aliased energy; and
   selecting the seismic attribute.

3. The method of claim 2, wherein the applying filters to the seismic traces comprises applying low-pass filters.

4. The method of claim 2, wherein the seismic attribute comprises a seismic attribute related to wave propagation direction.

5. The method of claim 1, wherein the multiplying the filtered traces comprises:
applying a transform to the filtered traces to transform the filtered traces from the space-time domain to the frequency-wavenumber domain, generating transformed filtered traces;
determining a function of frequency and wavenumber that represents the seismic attribute in the frequency-wavenumber domain;
selecting a sample of the transformed filtered traces in the frequency-wavenumber domain;
multiplying the sample of the transformed filtered traces by the selected function of frequency and wavenumber in the frequency-wavenumber domain, to generate scaled traces; and
applying an inverse transform to the scaled traces to inverse-transform the scaled traces from the frequency-wavenumber domain back to the space-time domain, generating inverse-transformed scaled traces.

6. The method of claim 5, wherein the applying a transform to the filtered traces comprises applying a Fourier transform.

7. The method of claim 5, wherein the function is a complex function of frequency and wavenumber.

8. The method of claim 5, wherein the applying an inverse transform to the scaled traces comprises applying an inverse Fourier transform.

9. The method of claim 1, wherein the dividing the scaled traces comprises:
calculating an envelope for the inverse-transformed scaled traces;
calculating an envelope for the filtered traces; and
dividing the envelope for the inverse-transformed scaled traces by the envelope for the filtered traces, to generate the seismic attribute.

10. The method of claim 1, wherein the dividing the scaled traces comprises:
dividing the inverse-transformed scaled traces by the filtered traces, to generate the seismic attribute.

11. The method of claim 1, wherein the seismic attribute is used in further processing of the seismic traces.

12. A method for transforming seismic signals representative of subsurface formations into a seismic attribute useful for identifying and characterizing the subsurface formations, comprising:
using a programmable computer to perform the following:
applying filters to the seismic signals to generate filtered signals with attenuated spatially aliased energy;
multiplying the filtered signals in frequency-wavenumber domain by a complex function of frequency and wavenumber representing the seismic attribute in the frequency-wavenumber domain, to generate scaled signals; and
dividing the scaled signals, transformed to time-space domain, by the filtered signals in the time-space domain, to generate a seismic attribute with attenuated spatially aliased energy.

13. The method of claim 12, wherein the applying filters to the seismic signal comprises:
using the programmable computer to perform the following:
acquiring the seismic signals from seismic sections;
applying filters to the seismic signals in the time-space domain to generate filtered signals with attenuated spatially aliased energy; and
selecting the seismic attribute.

14. The method of claim 13, wherein the applying filters to the seismic signals comprises applying low-pass filters.

15. The method of claim 13, wherein the seismic attribute comprises a seismic attribute related to wave propagation direction.

16. The method of claim 12, wherein the multiplying the filtered signals comprises:
using the programmable computer to perform the following:
applying a transform to the filtered signals to transform the filtered signals from the space-time domain to the frequency-wavenumber domain, generating transformed filtered signals;
selecting a sample of the transformed filtered signals in the frequency-wavenumber domain;
multiplying the sample of the transformed filtered signals in the frequency-wavenumber domain by a function of frequency and wavenumber that represents the seismic attribute in the frequency-wavenumber domain, to generate scaled signals; and
applying an inverse transform to the scaled signals to inverse-transform the scaled signals from the frequency-wavenumber domain back to the space-time domain, generating inverse-transformed scaled signals.

17. The system of claim 16, wherein the applying a transform to the filtered signals comprises applying a Fourier transform.

18. The method of claim 16, wherein the function is a complex function of frequency and wavenumber.

19. The method of claim 16, wherein the applying an inverse transform to the scaled signals comprises applying an inverse Fourier transform.

20. The method of claim 12, wherein the dividing the scaled signals comprises:
using the programmable computer to perform the following:
calculating an envelope for the inverse-transformed scaled signals;
calculating an envelope for the filtered signals; and
dividing the envelope for the inverse-transformed scaled signals by the envelope for the filtered signals, to generate the seismic attribute.

21. The method of claim 12, wherein the dividing the scaled signals comprises:
using the programmable computer to perform the following:
dividing the inverse-transformed scaled signals by the filtered signals, to generate the seismic attribute.

22. The method of claim 12, wherein the seismic attribute is used in further processing of the seismic signals.

23. A non-transitory computer readable medium containing computer instructions stored therein for causing a computer processor to perform steps comprising:
applying filters to seismic signals to generate filtered signals with attenuated spatially aliased energy;
multiplying the filtered signals in frequency-wavenumber domain by a complex function of frequency and wavenumber representing a seismic attribute in the frequency-wavenumber domain, to generate scaled signals; and
dividing the scaled signals, transformed to time-space domain, by the filtered signals in the time-space domain, to generate a seismic attribute with attenuated spatially aliased energy.

24. The medium of claim 23, wherein the applying filters to the seismic signal comprises:

acquiring the seismic signals from seismic sections;
applying filters to the seismic signals in the time-space domain to generate filtered signals with attenuated spatially aliased energy; and
selecting the seismic attribute.

25. The medium of claim 24, wherein the applying filters to the seismic signals comprises applying low-pass filters.

26. The medium of claim 24, wherein the seismic attribute comprises a seismic attribute related to wave propagation direction.

27. The medium of claim 23, wherein the multiplying the filtered signals comprises:
applying a transform to the filtered signals to transform the filtered signals from the space-time domain to the frequency-wavenumber domain, generating transformed filtered signals;
determining a function of frequency and wavenumber that represents the seismic attribute in the frequency-wavenumber domain;
selecting a sample of the transformed filtered signals in the frequency-wavenumber domain;
multiplying the sample of the transformed filtered signals by the selected function of frequency and wavenumber in the frequency-wavenumber domain, to generate scaled signals; and
applying an inverse transform to the scaled signals to inverse-transform the scaled signals from the frequency-wavenumber domain back to the space-time domain, generating inverse-transformed scaled signals.

28. The medium of claim 27, wherein the applying a transform to the filtered signals comprises applying a Fourier transform.

29. The medium of claim 27, wherein the function is a complex function of frequency and wavenumber.

30. The medium of claim 27, wherein the applying an inverse transform to the scaled signals comprises applying an inverse Fourier transform.

31. The medium of claim 23, wherein the dividing the scaled signals comprises:
calculating an envelope for the inverse-transformed scaled signals;
calculating an envelope for the filtered signals; and
dividing the envelope for the inverse-transformed scaled signals by the envelope for the filtered signals, to generate the seismic attribute.

32. The medium of claim 23, wherein the dividing the scaled signals comprises:
dividing the inverse-transformed scaled signals by the filtered signals, to generate the seismic attribute.

33. The medium of claim 23, wherein the seismic attribute is used in further processing of the seismic signals.

* * * * *

UNITED STATES PATENT AND TRADEMARK OFFICE
CERTIFICATE OF CORRECTION

PATENT NO. : 8,239,135 B2  Page 1 of 1
APPLICATION NO. : 12/387769
DATED : August 7, 2012
INVENTOR(S) : Anthony James Day et al.

It is certified that error appears in the above-identified patent and that said Letters Patent is hereby corrected as shown below:

on column 10, line 36, after "prospecting", delete "transforming"

Signed and Sealed this
Twenty-fifth Day of September, 2012

David J. Kappos
*Director of the United States Patent and Trademark Office*